United States Patent [19]

Baker et al.

[11] Patent Number: 5,530,807
[45] Date of Patent: Jun. 25, 1996

[54] COMMUNICATION SYSTEM ENABLING EXTERNAL CONTROL OF SYSTEM TERMINALS

[75] Inventors: Albert D. Baker, Lincroft; Heribert J. Blach, Old Bridge; Ramesh Caberwal, Atlantic Highlands, all of N.J.

[73] Assignee: AT&T Corp., Murray Hill, N.J.

[21] Appl. No.: 502,546

[22] Filed: Jul. 14, 1995

Related U.S. Application Data

[63] Continuation of Ser. No. 921,163, Jul. 29, 1992, abandoned.
[51] Int. Cl.$^6$ .................................................. G06F 13/00
[52] U.S. Cl. .................... 395/200.01; 395/800; 395/500; 370/110.1
[58] Field of Search ......................... 395/200.01, 800, 395/500; 379/67, 38, 211; 370/110.1

[56] References Cited

U.S. PATENT DOCUMENTS

| | | | |
|---|---|---|---|
| 4,919,545 | 4/1990 | Yu | 380/25 |
| 5,012,511 | 4/1991 | Hanle et al. | 379/211 |
| 5,062,108 | 10/1991 | Bales et al. | 370/110.1 |
| 5,170,426 | 12/1992 | D'Alessio et al. | 379/38 |
| 5,185,742 | 2/1993 | Bales et al. | 370/110.1 |
| 5,222,124 | 6/1993 | Castaneda et al. | 379/67 |
| 5,278,972 | 1/1994 | Baker et al. | 395/500 |

OTHER PUBLICATIONS

Yu, "Access Control and Authorization Plan for Customer Control of Network Services", IEEE, 1989, pp. 862–869.
Itoh et al., "Intelligent Network Management for Customer Controlled Services", IEEE, 1989, pp. 1177–1181.
Matsuyuki et al., "A Study on Appropriate Function Allocation for an End Customer Controlled Network Operation System", IEEE, 1991, pp. 1022–1026.
Yeh et al., "The Evolving Intelligent Network Architecture", IEEE, 1990, pp. 835–839.

*Primary Examiner*—Alyssa H. Bowler
*Assistant Examiner*—Walter D. Davis, Jr.
*Attorney, Agent, or Firm*—John A. Caccuro

[57] ABSTRACT

A communication system enables a system controller to allocate to a first system endpoint (e.g., application processor) control over one or more components of a second system endpoint (e.g., terminal). In response to a valid control request signal received from the first endpoint identifying one or more components at the second endpoint over which control is requested, the controller sends an acknowledgment signal to the first endpoint indicating that control over the identified component(s) has been allocated to the first endpoint. In response to the acknowledgment signal, an endpoint interface enables the first endpoint to directly communicate with the second endpoint using a first endpoint originated control signal which simulates a controller originated control signal for controlling the identified components at the second endpoint. The controller then inhibits itself from controlling the identified component(s) at the second endpoint during the time when the first endpoint has been allocated to control over the identified component(s).

22 Claims, 7 Drawing Sheets

FIG. 1 SYSTEM OVERVIEW

FIG. 2 SYSTEM MESSAGING PHASES

| | APPLICATION PROCESSOR 133 | CALL AND USER INTERFACE CONTROL COMPLEX 103 | TERMINAL INTERFACES | TERMINALS |
|---|---|---|---|---|
| PHASE 1 201 | INIT 206 | INIT 211 | INIT 216 | INIT 221 |
| PHASE 2 202 | IDENTIFY TERMINAL<br>-QUERY TERMINAL INFORMATION<br>(IDENTIFY, TYPE,...) 207 | VALIDATE:<br>- PROCESSES QUERY REQUEST<br>- RETURN TERMINAL INFORMATION 212 | INIT 217 | INIT 222 |
| PHASE 3 203 | REQUEST/RELEASE CONTROL OF TERMINAL COMPONENTS<br>-IDENTIFY ATTRIBUTES<br>-e.g. DISPLAYS (LINES,...)<br>BUTTONS (ALL, KEYPAD) 208 | VALIDATE REQUEST<br>-EXAMINE TERMINAL STATUS<br>-TRANSFER CONTROL TO APPLICATION PROCESSOR<br>-UPDATE TERMINAL INTERFACE ROUTING CONTROL TABLE 620 213 | INIT 218 | INIT 223 |
| PHASE 4 204 | SEND MESSAGES DIRECTLY TO TERMINAL INTERFACE<br>RECEIVE MESSAGES FROM TERMINAL INTERFACE 209 | 214 | CHECK MESSAGE COMPONENTS TO ROUTE MESSAGE 219 | 224 |

FIG. 4 DATA TRANSFER MESSAGE FLOW

FIG. 5

COMPONENT CONTROL TABLE (103)
500

| ROUTING (501) | TERMINAL ENDPOINT (502) | COMPONENT (503) | ATTRIBUTE (504) |
|---|---|---|---|
| CONTROL COMPLEX (103), APPLICATION PROCESSOR (133), REMOTE APPLICATION PROCESSOR (138) | TERMINAL 114 | DISPLAY<br>BUTTON<br>AUDIBLE<br>LED | ALL, LINE X, LINE Y,...<br>ALL, SOFTKEY,...<br>ALL, BEEPS,...<br>ALL |
| ... | TERMINAL 111 | ... | ... |

UPLINK ROUTING CONTROL TABLE IN TERMINAL INTERFACE (104, 105)
520

| TERMINAL ENDPOINT (526) | CODESET (530) | COMPONENT (527) | ATTRIBUTE (528) | ROUTING (529) |
|---|---|---|---|---|
| TERMINAL 114 | 6/7 | DISPLAY<br>BUTTON<br>AUDIBLE<br>LED | ALL, LINE X, LINE Y,...<br>ALL, SOFTKEY,...<br>ALL, BEEPS,...<br>ALL | CONTROL COMPLEX (103), TERMINAL INTERFACE (104, 105), APPLICATION PROCESSOR (133), REMOTE APPLICATION PROCESSOR (138) |
| TERMINAL 111 | ... | ... | ... | ... |

FIG. 6
OPERATION OF CONTROL COMPLEX 103

COMMUNICATION SYSTEM ENABLING EXTERNAL CONTROL OF SYSTEM TERMINALS

This application is a continuation of application Ser. No. 07/921,163, filed on Jul. 29, 1992, now abandoned.

TECHNICAL FIELD

This invention relates to communication systems and, more particularly, to a communication system which enables intelligent adjunct processors to directly control system terminals.

BACKGROUND OF THE INVENTION

In well-known communication systems, system controllers control both internal communications and external communications to system terminals. In certain systems, the system controller may also control adjunct apparatuses (voice mail systems, automatic call distributors, etc.) which provide new features and which may often require substantial communication interactions with the system controllers and terminals. Undesirably, providing these additional adjunct features may add significantly to the processing load which must be handled by the system controller. In some circumstances, this additional processing load may adversely affect the normal communication services provided by the system. What is desired is a communication system arrangement in which adjunct features may be provided without substantially adding to the processing load of the system controller.

SUMMARY OF THE INVENTION

In accordance with the present invention, a controller of a communication system enables a first system endpoint (e.g., application processor) connected via an interface thereto to assume direct control over one or more components at a second system endpoint (e.g., terminal 114). In response to a valid control request signal received from the first endpoint identifying one or more components at the second endpoint over which control is requested, the controller sends an acknowledgment signal to the first endpoint indicating that control over the identified component(s) has been allocated to the first endpoint. In response to the acknowledgment signal, the endpoint (or terminal) interface enables the first endpoint to directly communicate with the second endpoint using an endpoint-originated control signal which simulates a corresponding controller-originated control signal for controlling the identified components at the second terminal. The controller then inhibits itself from controlling the identified component(s) at the second endpoint during the time when the first endpoint has been allocated to control over the identified component(s).

GENERAL DESCRIPTION

In the following description, elements of each figure have reference designations associated therewith, the most significant digit of which refers to the figure in which that element is located (e.g. 100 is located in FIG. 1).

Figure 1:
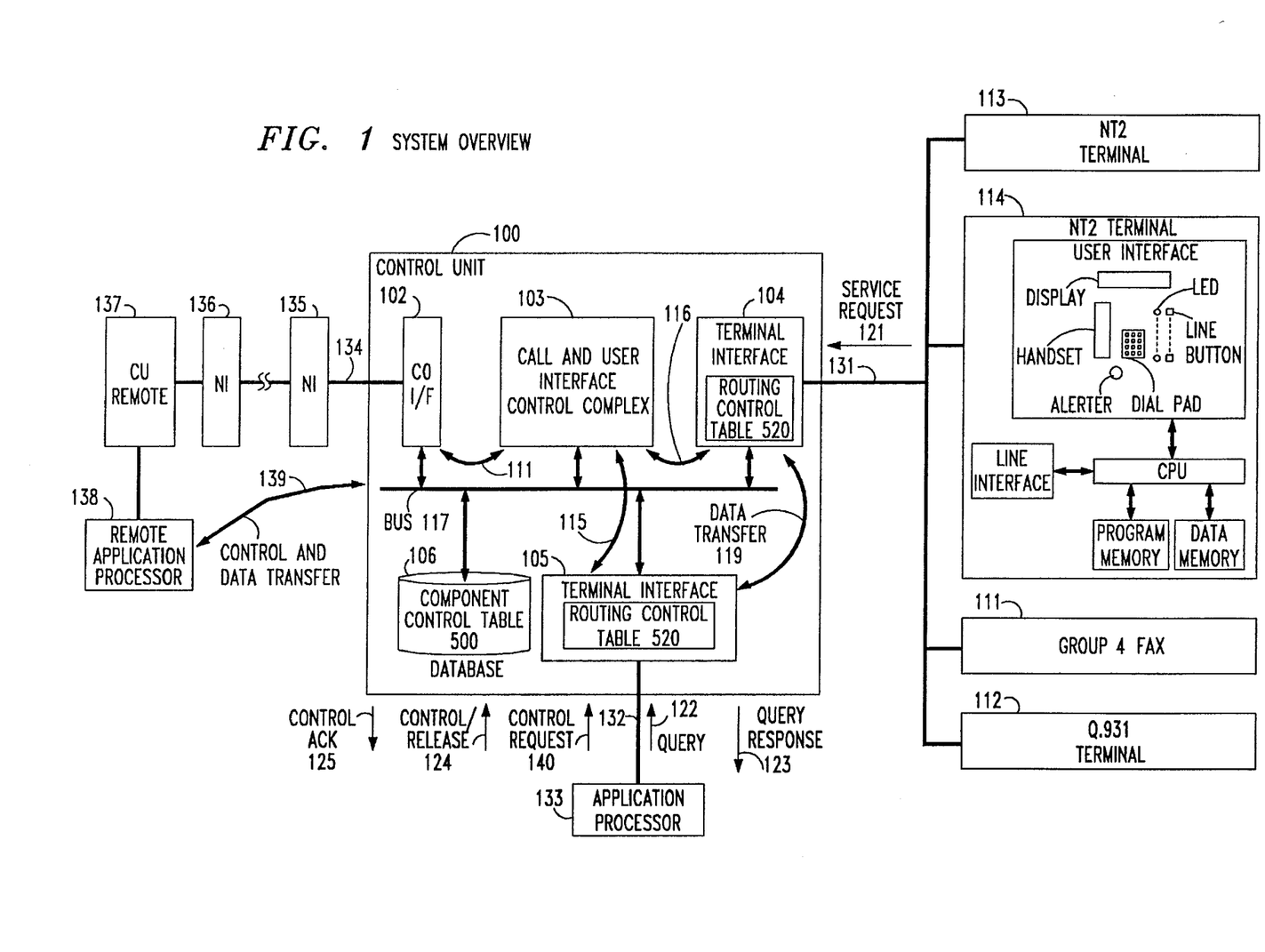
FIG. 1 is a block diagram of a communication system embodying the present invention.

Shown in FIG. 1 is an illustrative block diagram of a communication system useful in describing the operation of the present invention. The system might, for example, be installed on the premises of a small business. The system includes a Control Unit (CU) 100 which connects to one or more Switching Network (e.g., Central Office (CO)) lines 134 via Interface 102, and which connects via Interface 104 to one or more facilities 131 to, illustratively, one or more NT2 compatible terminals such as 113 and 114, a Group 4 (G4) FAX Machine 111 and a Q.931-compatible terminal 112. Facility 131 may be, for example, a point-to-point facility (not shown) or a multipoint passive bus, as shown in FIG. 1. In addition, an Application Processor (AP) 133 is attached to CU 100 via facility 132 and Terminal Interface 105. The terminals 111–114, application processor 133 and remote application processor 138 may also, more generally, be referred to herein as endpoints. And terminal interfaces 104 and 105 may also, more generally, be referred to as endpoint interfaces.

A remote Application Processor 138 may connect via a remote control unit 137, Switching Networks 136 and 135 and line 134 to Control Unit 100. Interface 102 operates in the same manner as Interface 105. Remote Control Unit 137, illustratively, may be implemented in the same way as Control Unit 100. According to the present invention, either local Application Processor 133 or Remote Application Processor 138 may each have one or more application programs which may request to directly control the terminals 111–114 in the manner described in subsequent paragraphs. For the purpose of the present invention, Application Processors 133 and 138 may be viewed as control apparatuses or control terminals which may be allocated control over system terminals 111–114.

In one embodiment AP 133 and AP 138 utilize a novel local protocol (NT2) and are identified to CU 100 either through administration of CU database 106 or via an NT2 identification procedure or both, as an NT2 compatible Application Processor.

The NT2 is a local protocol which is a modified Q.931 protocol used for basic rate ISDN communications with a public or a private switching network. The NT2 protocol is used for controlling communications between NT2 or Q.931 compatible station terminals (e.g. 114) and the Control Unit 100 of the system. The NT2 local protocol is described in the pending patent application identified as Ser. No. 07/616,961 and entitled "Communication System Having ISDN Signaling Capability" which is incorporated herein by reference. The Q.931 protocol is defined by "The International Telegraph and Telephone Consultative Committee, Digital Subscriber Signalling System Number 1, Network Layer, Recommendation Q.931, Geneva, 1989."

Briefly, the Q.931 protocol defines eight logical sets of codes, some of which are reserved, that are usable in different contexts. For example, Codeset Zero is defined by CCITT, and is the default codeset assumed at the beginning of each Q.931 message. The alternate Codesets of interest are Codeset 6, used by the local network to support additional functions beyond those available in Codeset 0, and Codeset 7 which carries information that is originated at one endpoint or terminal and is to be passed to the remote endpoint or terminal. Note, an end-point may include a voice terminal, a data terminal, an application processor, etc.

The Q.931 protocol also defines standard mechanisms for switching between the various Codesets. These mechanisms are known as "shifts", and two varieties are defined: the locking shift and the non-locking shift. According to the procedures of Q.931, all messages are assumed to be coded in Codeset 0 until indicated otherwise by the presence of a shift element. This structure allows implementations to only apply treatment to codesets of interest, and pass other codesets to endpoints for further operations.

In the present invention, the Codeset 7 shift is used to indicate that subsequent information in the message has end-to-end significance and is from one endpoint to another endpoint. The Codeset 6 information that follows the Codeset 7 shift indicator is the payload or data trailer that is to be delivered to the remote endpoint. Thus, every message originating from an application processor (e.g., AP 133) and destined for another terminal (e.g., 114) originates as a message containing Code set 7 message (including embedded Codeset 6 elements, see 411 of FIG. 4), which is converted by an interface (i.e., 105) to a Codeset 6 message (see 413 of FIG. 4) for delivery to the other terminal (i.e., 114). Similarly, a response from terminal 114 would originate as a Codeset 6 message (see 414 of FIG. 4) and would be converted (reformatted) by Interface 104 into a Codeset 7 message (see 415 of FIG. 4) for delivery to receiving terminal (i.e., AP 133). For the purposes of describing the present invention it will be assumed that all facilities and terminals are NT2 compatible.

Control Unit 100 is shown to include Call and User Interface Control Complex 103, CO Interface 102 and Terminal Interfaces 104 and 105 which intercommunicate over bus 117. Control unit 102 also includes well-known, but not illustrated, components such as a call control switch, program memory and data memory. The program memory provides instructions to CU 100 for controlling the switch to provide the standard communications functions of the system as well as the various operating features and functions of the system in accordance with the present invention.

The present invention describes a control negotiation and control allocation procedure which enables Call and User Interface Control Complex 103, to allocate control of one or more components at a system terminal to Application Processor 133 via Interface 105. The general operation may, illustratively, be described as follows. In a first operating mode, we assume that a service request message 121 is received from Terminal 114 via Facility 131. This service request message is received by Terminal Interface 104 and relayed, 106, to Control Complex 103. The Control Complex 103 accesses the administrative data base 106 and determines that the service request is for an Application Processor 133 provided service. The Control Complex 103 then transfers a message, 115, to Terminal Interface 105, which then transmits the message to Application Processor 133 via Facility 132. (Note, if the service request was for Application Processor 138 then the message path would be 111 and 139). Application Processor 133 recognizes the service request message and issues a response. In Case 1, the Application Processor 133 response is to honor the service request, and send a query message 122 via Facility 132 and Terminal Interface 105 to Control Complex 103 requesting terminal data (such as terminal ID, type, etc.) regarding originating Terminal 114.

The control complex 103 responds with query response 123, containing the terminal date. The AP 133 then sends control request 140 requesting control of some or all of the components of terminal 114. Control ACK 125 is issued by control complex 103 allocating control of the requested terminal to the AP 133, thereby entering the data transfer phase of the operation.

In Case 2, the response is to deny the control request 140, (after responding to query 123 with a control request 140) perhaps due to full utilization of the Application Processor 133 capacity, and to issue a "denial of service" message, 115, via Facility 132 and Terminal Interface 105 to Control Complex 103. Control Complex 103 then formats a message, 106, indicating denial of service to the originating Terminal 114, via Terminal Interface 104 and Facility 131.

In a second operating mode the process may be originated by Application Processor 133. In Case 1, Application Processor 133 sends a Query, 122, to Control Complex 103 requesting terminal type and identification information. If the request is valid, Control Complex 103 sends a query response, 123, to Application Processor 133 providing dial plan, terminal type and identification information.

In Case 2, in the second operating mode, we assume that Application Processor 133 has been preprogrammed with all the dial plan, terminal type, and identification information for all terminals 111–114 which connect to control unit 100. Following either the first or second operating mode, Application Processor 133 can request control over one or more components by transmitting control request 140 to a particular terminal. If Control Complex 103 determines that the control request is valid it sends a control Acknowledgment signal, 125, to Application Processor 133 allocating it control over the identified components of the terminal. Thereafter, Application Processor 133 acts like the Control Complex 103 with regard to control over those identified components at the terminal. All other components at that terminal remain under control of Control Complex 103. Under certain predefined conditions, Control Complex 103 can regain control from Application Processor 133 over components previously allocated thereto. Application Processor 133 can voluntarily relinquish control over the components of the terminal allocated to it by sending a control release signal to Control Complex 103. If the control release is valid, Control Complex 103 relinquishes Application Processor 133 from control of the allocated components of the terminal.

DETAILED DESCRIPTION

Figure 2:
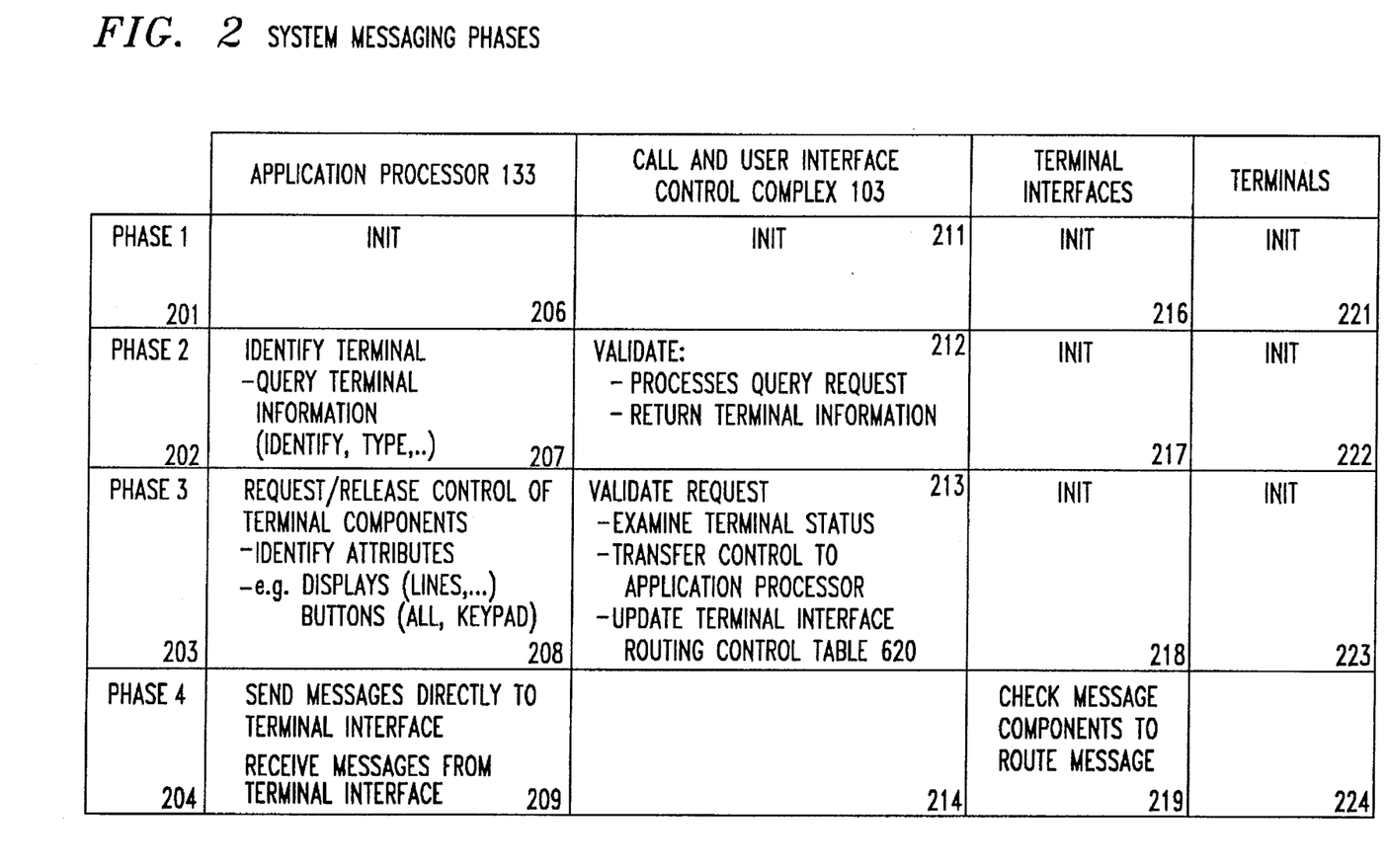
FIG. 2 is a table depicting the various phases of operation of the system shown in FIG. 1.
Figure 5:
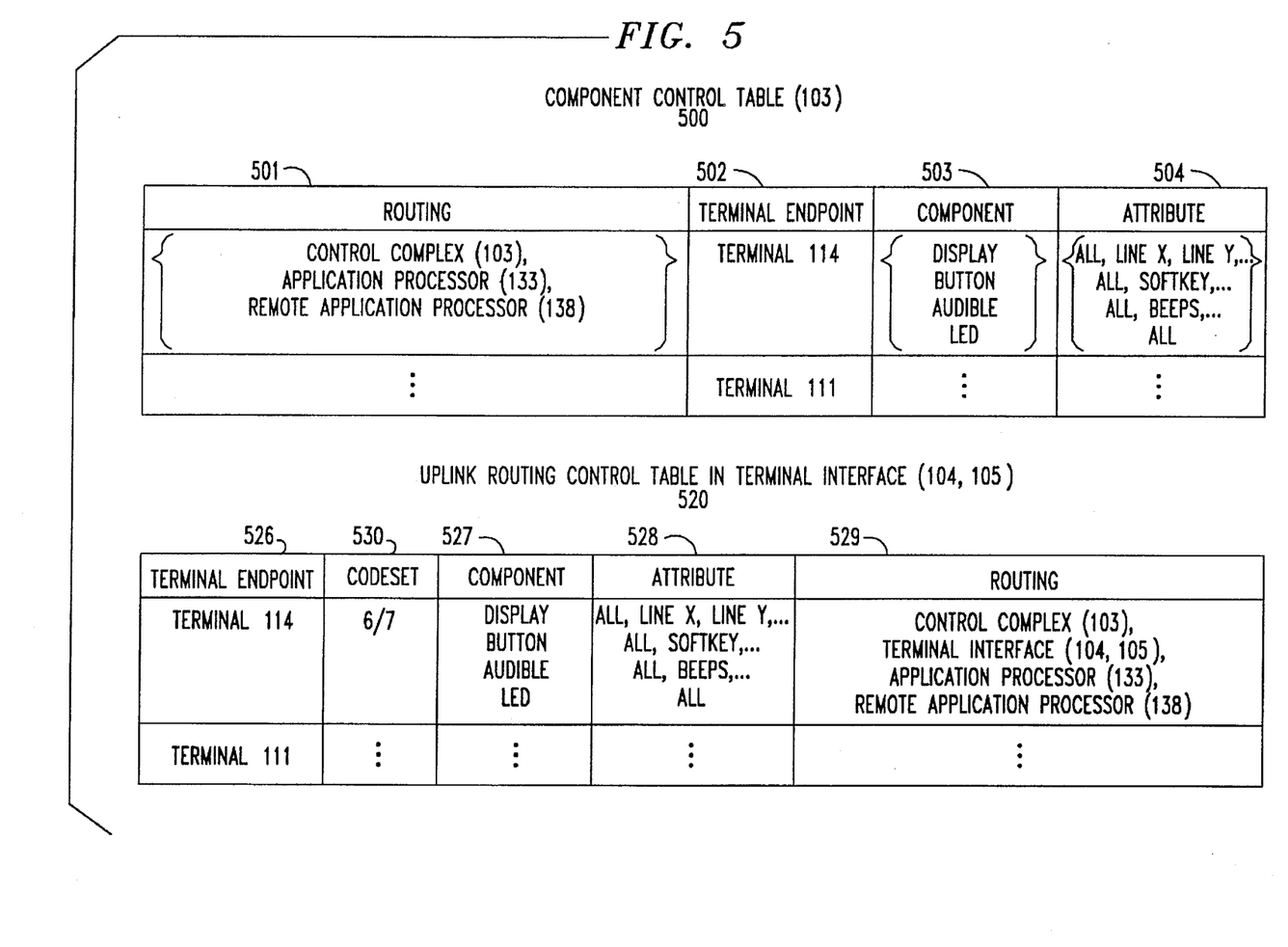
FIG. 5 illustrates a component control table and an uplink routing control table.

With joint reference to FIGS. 1, 2 and 5 we describe the system messaging phases that are useful in understanding the operation of the invention. During Phase 1, all system components and subsystems are in the Initial state (206, 211, 216 and 221 ); that is, all system communication paths are set to the default condition and operate under control of Control Complex 103. During Phase 1 the Component Control Table 500 and Uplink Routing Control Table 520 indicate that all components of all terminals are under control of Control Complex 103.

Phase 2 is entered at the request of the Application Processor 133, which, in our example, queries (207) Control Complex 103 for information about the components of terminal 114 which Application Processor 133 wishes to control for a particular application service. The Control Complex 103 responds (212) to queries from Application Processor 133. All routing information in each Routing Table 520 located at each terminal interface, remains set to the initial or default condition (217) and the terminals remain set to their initial condition (222).

Phase 3 is entered when the Application Processor 133 requests control of specific endpoint components 208, of a particular terminal e.g., 114, from the Control Complex 103, and is granted that control 213. Again, the terminal interfaces and terminals remain at their initial conditions, 218 and 223, respectively. The final action of Phase 3 is for the Control Complex 103 to update the terminal routing tables 213, causing transition to Phase 4. Thus, both Component Control Table 500 and Routing Table 520 are updated to indicate which components at which terminals are controlled by the Control Complex 103 or an Application Processor.

During Phase 4, communications between the Application Processor 133 and the terminal 114 operate in a direct transfer mode 209; that is, messages are directly sent to, and directly received from, the terminal interfaces 104 and 105 (via path 119) bypassing the Control Complex 103 for the duration of the transaction 219. Phase 4 is exited when the Application Processor 133 determines that the application service is complete, and advises the Control Complex 103. This takes the form of a control release request, a Phase 3 type request. At that time, the routing tables (500 and 520) and terminal allocations are returned to the initial state. This returns the system to Phase 1.

Figure 3:
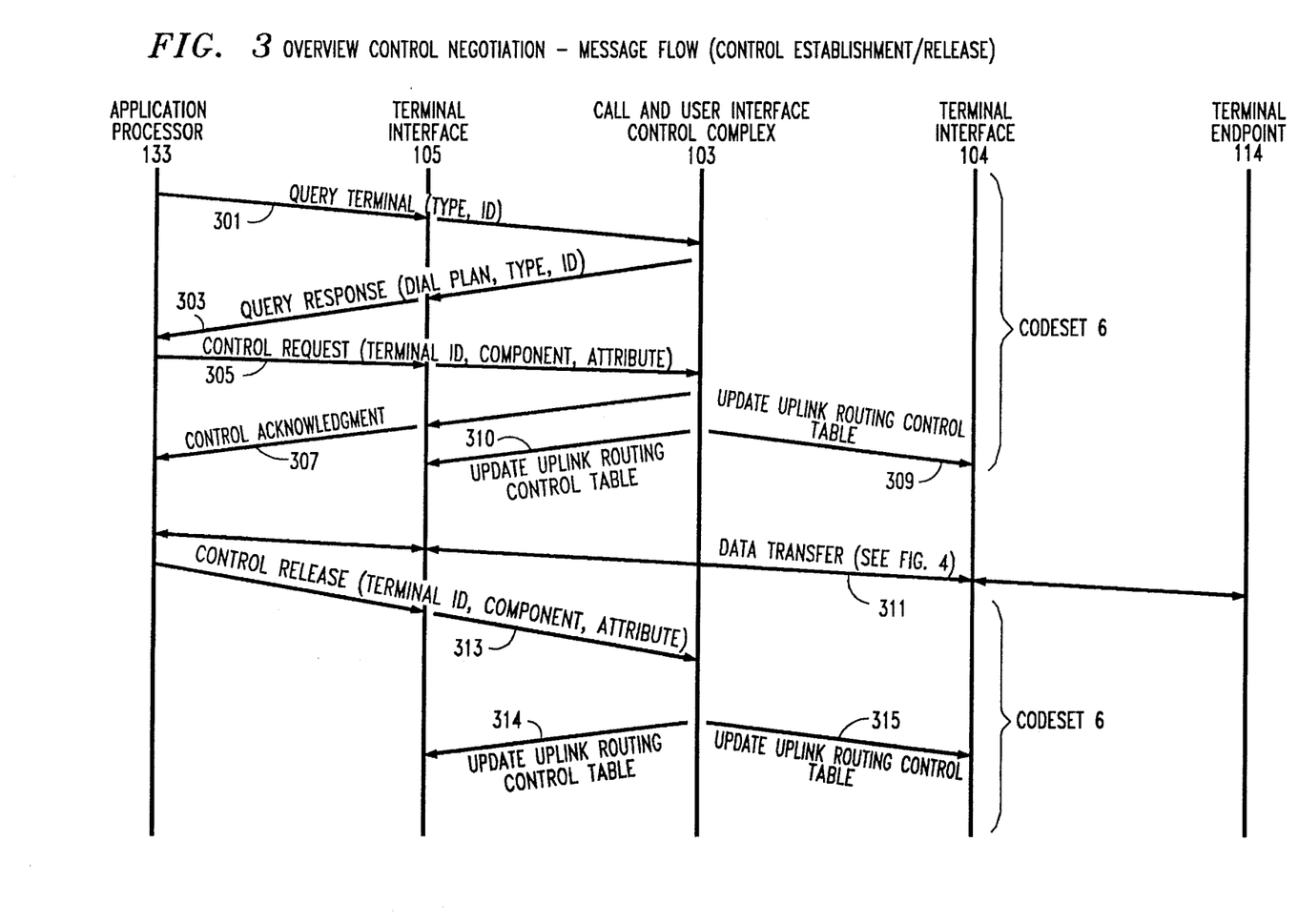
FIG. 3 illustrates the message flow associated with the control negotiation in accordance with the present invention.

With joint reference to FIGS. 1, 3 and 5, we describe the operations in more detail. Application Processor 133, in response to a terminal-originated service request or a self-initiated request, queries, in step 301, the Control Complex 103 for administrative information on the endpoint from Database 106 and negotiates for control of Terminal 114. The Query message 301, includes information identifying the terminal and its type. The Application Processor 133 accesses Database 106 to retrieve the specific terminal information that it needs to decide what type of control requests to issue. (For example, if a terminal has only a 24 line display, it does not make sense for Application Processor 133 to request control for line 50). Depending on the complexity of the control request, Application Processor 133 may send one or more Query messages 301 via Terminal Interface 124 to Control Complex 103. For example, Application Processor 133 may request control of one component (such as display lines 1 and 2) or a more complex request which includes display lines 1 and 2 along with soft-key buttons and specific error tones in an alerter. Note, that FIG. 3 assumes a simple control request, and, as such only one Query message 301 is sent from the Application Processor 133. According to one aspect of the present invention, Application Processor 133 may be preprogrmmmed with the terminal identity and type for all terminals 111–114 of the system.

The Control Complex 103 retrieves the requested terminal information from its internal database 106 and responds to the Application Processor 133 by sending a Query Response message 303 to Terminal Interface 105 for each received Query message 301. The Query Response message 303 includes the terminal dial plan, type and identification which is passed from Terminal Interface 105 to the Application Processor 133. In our NT2 Protocol example, the Response message 303 is an NT2 Protocol message containing one or more Codeset 6 information elements including a query response and a data element containing the requested information about Terminal 114, including the Terminal 114 address and information defining the various components contained in Terminal 114. The Application Processor 133 evaluates the received terminal 114 component list, selects those components appropriate for execution by an application program of Application Processor 133. Application Processor 133 then sends one or more Control Request messages, in step 305, to Control Complex 103 via Terminal interface 105 to identify the terminal components and attributes of the component that the Application Processor 133 desires to control. In our NT2 protocol example, this Control Request message contains one or more Codeset 6 information elements defining the request list of Terminal 114 components to be directly controlled by the Application Processor 133 for the duration of the control span. These Control Request messages, 305, contain the component to be controlled (e.g. display, audibles) as well as control attributes (e.g. particular lines, all lines). The communication path between the Terminal 114 and the Application Processor 133 up to this point has been via internal communication paths 106 and 115, with Control Complex 103 providing the message processing services. After the Control Complex 103 receives and approves the component and control request list, it issues a Control Acknowledgment message, in step 307, to Application Processor 133 via Terminal Interface 105.

The Control Complex 103 sends a Control Acknowledgement message in step 307 to Terminal Interface 124, for each Control Request message 305. These Control Acknowledgement messages 307 contain information as to whether or not the requested control was granted and reasons for failure if control is not granted. Control can not be granted, for example, if another Application Processor, such as 138, has control over the requested component.

Assuming that control was granted, the Control Complex 103 sends an "Update Uplink Routing Control Table" message, in steps 309 and 310, to both Terminal Interfaces 104 and 105. In response, Terminal Interfaces 104 and 105 update their uplink routing control tables accordingly (shown by 520 in FIG. 5). Additionally, Control Complex 103 updates its own control table (shown by 500 in FIG. 5) to indicate the control allocation to Application Processor 133.

For each Control Request message 305 that was acknowledged positively, a data transfer phase (Phase 4 of FIG. 2) is established and, in step 311, a data transfer is established directly between the Terminal Interface 105 and the Terminal Interface 104. This is shown by the Data Transfer Path 119. In our example, the Data Transfer messages 311 include NT2 protocol information elements (component, attributes) which are predicated by a Codeset 7 indicator, issued by Application Processor 133 via Interface 105. Such elements will not be processed by Control Complex 103, because its control table (500 of FIG. 5) indicates that those components have been allocated to AP 133. Interface 105 removes the message header and the resulting NT2 standard protocol messages are directly communicated to Terminal 114 via data transfer path 119 for the duration of the control span.

Thus, according to the present invention, for the duration of the application transaction the Application Processor 133 controls the allocated components of Terminal 114 in a manner equivalent to that normally exercised by the Control Complex 103. That is, the Application Processor 133 formats messages (signals) using the same NT2 protocol elements normally issued to the Terminal 114 by Control Complex 103 for those terminal components (or attributes) allocated to the Application Processor 133 for the execution of its application function. These standard NT2 protocol elements are predicated by a Codeset 7 indicator to Terminal Interface 105 which indicates that the following message elements are part of an authorized direct data transfer, and are eligible for direct transport via communication path 119 to interface 104.

The benefit of this architecture is that the Application Processor 133 can execute its application transaction without involving the Control Complex 103 in either the details of the transaction, or in receiving, analyzing, reformatting, and retransmitting messages from Application Processor 133 to NT2 Terminal 114 and vice versa. This allows support of general purpose Application Transactions, provided by Application Processor 133, without updating the Control Complex 103. This is because Control Complex 103 need not know information about the application transaction itself, except that control of certain Terminal 114 components has been allocated to the Application Processor.

Note that during the allocated control interval, Control Complex 103 may continue to provide normal communication services to Terminal 114 via all terminal components not previously allocated to Application Processor 133. As previously noted, there may be more than one Application Processor (e.g., 138) attached to the system, and that the Control Complex 103 may allocate Terminal components to it or others simultaneously so that several application transactions may be actively controlling different portions of Terminal 114 concurrently. Additionally, one Application Processor 133 may operate several different application transactions concurrently and would keep track of the components allocated to each application transaction.

The control interval, i.e., the period of time during which Application Processor 133 can directly control selected Ternfinal 114 components via communication path 119, may be terminated in three ways. First, Application Processor 133 may signal completion of its functions using a Control Release message as shown in step 313. Control Complex 103 would then send the Update Routing Messages 314 and 315 to deallocate control over Terminal 114 components. (Note, message 314 may be part of an Acknowledgment message similar to 307). Second, Terminal 107 may signal a request for termination of the Application Transaction (see 604 of FIG. 6). Third, the Control Complex 103 may detect an event or condition of higher priority, or other unspecified means which cause it to override the allocated control (see 650 of FIG. 6) and to terminate the control interval. When the control interval is terminated, the Control Complex 103 issues an Update Uplink Routing Control Table 520 message, in Codeset 6 of the NT2 ISDN protocol which deallocates Application Processor 133 control of Terminal 114 components, (in table 520 of FIG. 5) and terminates its access to communication path 119 for communication with Terminal 114.

Note that if Control Complex 103 decides to release control, it also does so by sending a Control Release message to Terminal Interface 105. This could happen, for example, if a process or application processor (e.g., 138) with higher priority requests control of a component which is currently allocated to by Application Processor 133. The Control Complex 103 may then decide to send a Control Release message to the Application Processor 133 identifying the terminal components whose control is to be returned to Control Complex 103.

Figure 4:
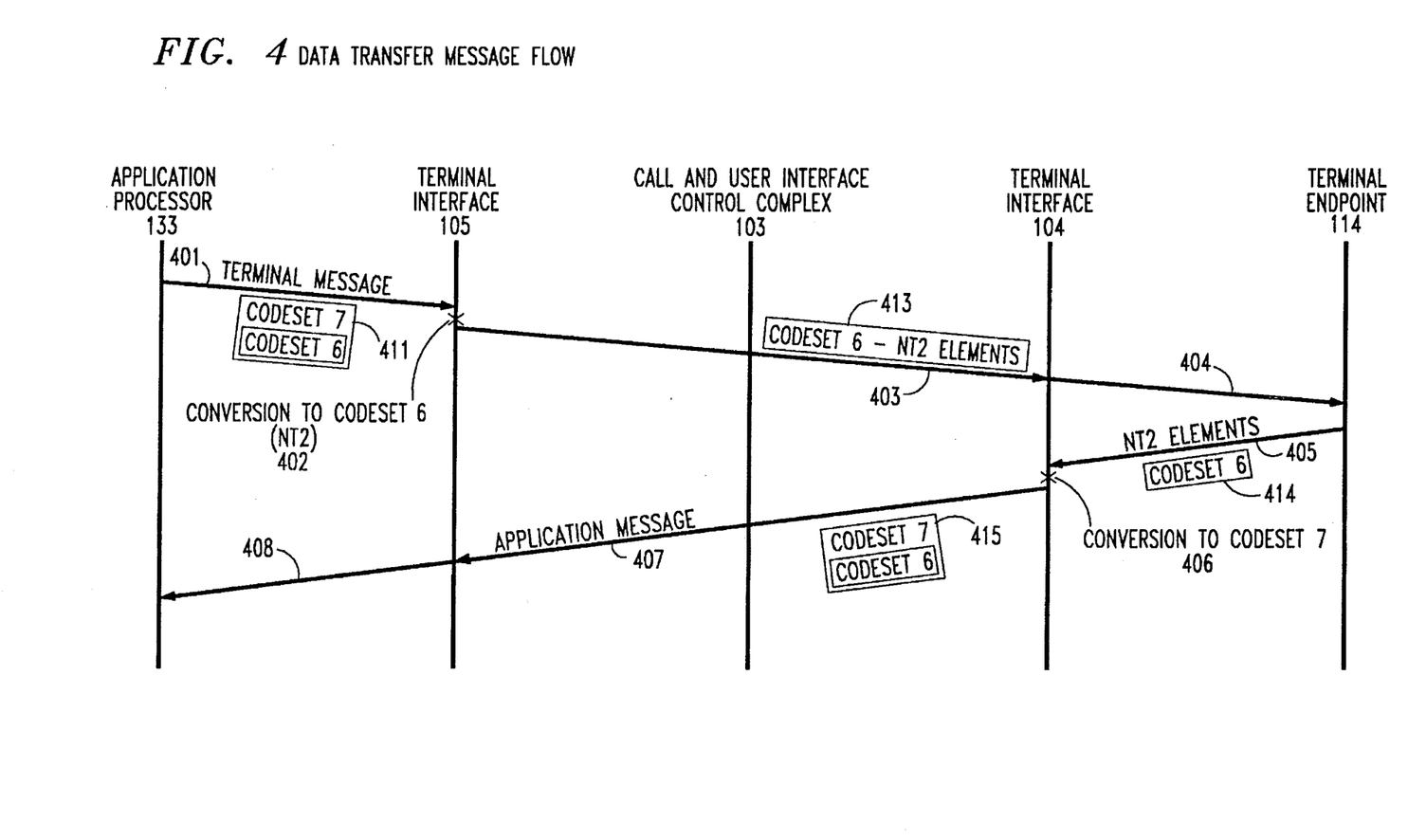
FIG. 4 shows the data transfer message flow between an application processor and a terminal.

With joint reference to FIGS. 1, 3, 4 and 6 we describe the data transfer message flow operation. FIG. 4 illustrates the details of the data transfer phase, step 311, as it pertains to the Application Processor 133, Terminal Interface 105, Control Complex 103, Terminal Interface 104 and Terminal 114. Data transfer phase is where Terminal Interface 105 directly communicates with Terminal Interface 104, via path 119, thereby bypassing Control Complex 103.

Figure 7:
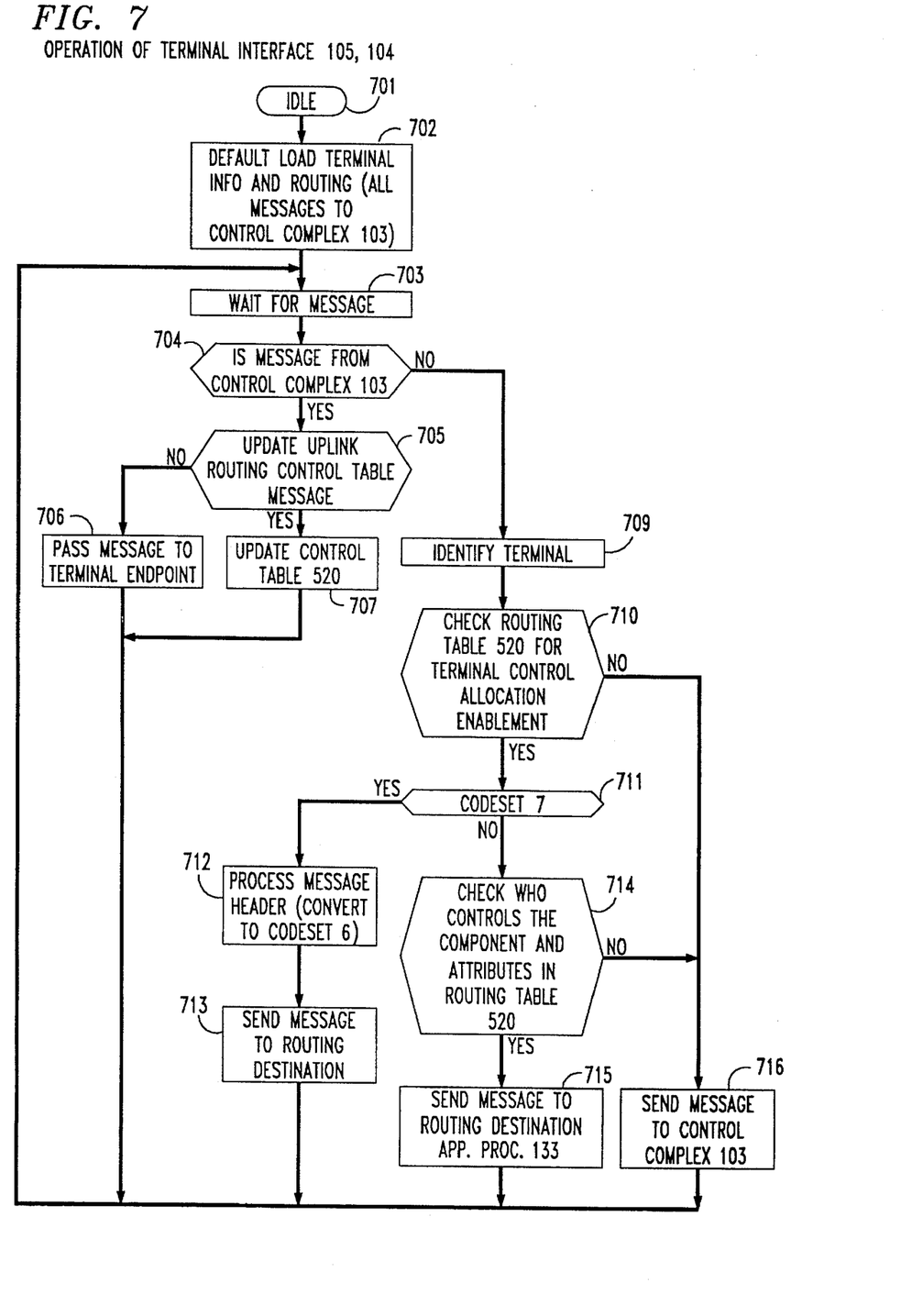
FIG. 7 shows a flow chin describing the operation of a terminal interface.

At Terminal Interface 105, the decision as to where to route messages is made on the basis of the information in Routing Table 520 and the Codeset (described in detail in FIG. 7). Assuming that the data transfer phase has been established, Application Processor 133 may control the allocated components at Terminal Endpoint 114 component by sending a Codeset 7 Terminal Endpoint Message step 401 having Codeset 6 (NT2) Information Elements, step 403, embedded therein. At step 402, Terminal Interface 105 converts the Codeset 7 Terminal Endpoint Message, step 401, into NT2 Information Elements, step 403, and passes the NT2 Information Elements onto Terminal Interface 104. At step 404, Terminal Interface 104 passes the NT2 Information Elements, step 403, to Terminal 114.

Similarly, at Terminal Interface 104, the decision where to route messages received from Terminal 114, is made on the basis of entries in Routing Table 520 and the Codeset described in FIG. 7). Assuming that data transfer phase has been established, Terminal Interface 104 may communicate directly with Terminal Interface 105. Terminal 114 sends NT2 Information Elements, step 405, to Terminal Interface 104. At step 406, after checking its Routing Table 520, Terminal Interface 104 converts the Codeset 6 (NT2) Information Elements into a Codeset 7 Application Message, and in step 407, passes the Codeset 7 message onto Terminal Interface 105. At step 408, Terminal Interface 105 passes the Codeset 7 Application Message, step 407, onto Application Processor 133.

With joint reference to FIGS. 1, 3, 5 and 6 we describe the operation details of Control Complex 103. Control Complex 103 is that pan of the Control Unit 100 that is responsible for controlling external devices (such as Terminals 111–114 and Application Processors 133 and 138). Control Complex 103 receives messages from: Terminal e.g., 114, via interface 104; Application Processor 133 via interface 105; and Remote Application Processor 138 via interface 102.

Figure 6:
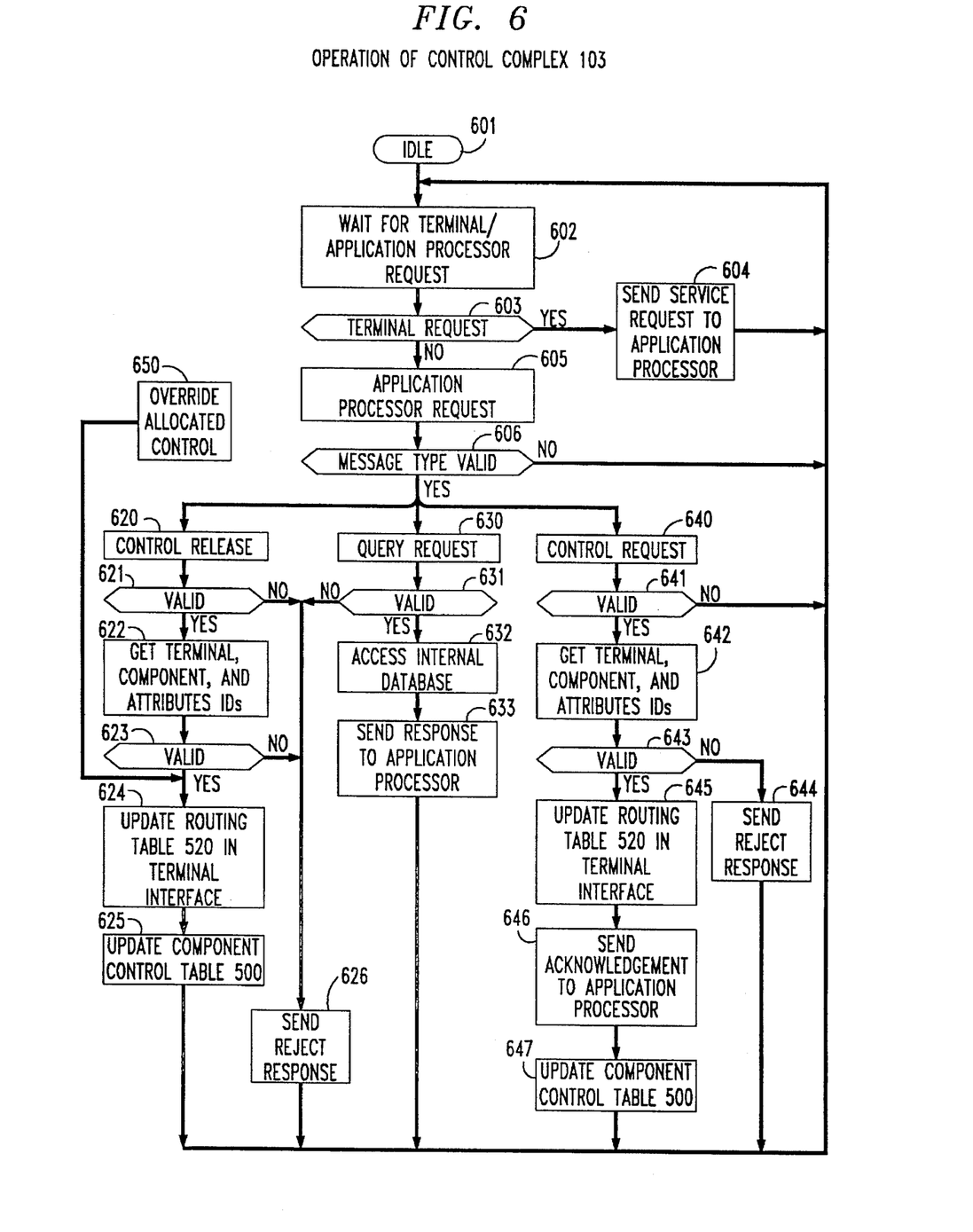
FIG. 6 shows a flow chart describing the operation of the call and user interface Control Complex.

After system initialization, Control Complex 103 waits in idle state 601 for external messages received in step 602 which are then processed according to the source of the message. Terminal requests for application services, steps 603 and 604, are passed to the selected application processor (i.e., either 133 or 138). In step 605, if an application request is received from an application processor, then in step 606 it is determined if it is a valid request. This is determined by comparing the request against entries in the Component Control table 500. If an invalid message is received then error condition handling is invoked (e.g., terminate the process), otherwise the type of application message is determined. Various types of application messages can be received including: query for system or terminal endpoint information, step 630, request for terminal control, step 640, and release of terminal control, step 620.

Query Request (301) processing, steps 630–633, allow Application Processor 133 or 138 to obtain information about the system or a specific terminal (e.g., 114). Control Complex 103 validates the request in step 631. If invalid parameters are received error condition handling is invoked. Valid requests result in the Control Complex 103 accessing Database 106, in step 632, and formulating a Query response message (303) in step 633.

In step 640, a terminal Control Request message (305) is received. This procedure allows the requesting Application Processor (e.g., 133) to obtain control of various terminal components and attributes (503 and 504 of Component Control Table 500). The Control Complex 103 validates the receive Control Request in step 641 and rejects invalid messages. A valid control request, step 642, contains the identity of the required terminal and various components (e.g., display, button) with their desired attributes (e.g., all buttons, 3 lines of display). In step 643, Control Complex 103 verifies that the specified components are available by checking the Component Control Table 500 in Database 106. A valid control request from an Application Processor is determined by comparing the terminal, component and attribute data in the message against the Routing Table 520. A control request is invalid if the Application Processor already has control over the requested item. If an invalid request is made, a reject response is given and the process is terminated. For a valid request, Control Complex 103, in step 645, notifies Terminal Interface 104 of the change in message routing (for the specified Ternfinal Endpoint and components). The Terminal Interface 104 then updates entries in its Routing Table 520. Thus, future messages received from the Terminal Endpoint 114 are filtered, using Routing Table 520, and passed via interface 119 directly to the desired Application Processor 133 via interface 105. In step 646 Control Complex 103 then sends a Control Acknowledgement message (307) to the requesting Application Processor 133. In an alternate embodiment, the Control Acknowledgment message or signal 103 may include the message 310 which updates Routing Table 520.

Control release (313) processing enables an Application Processor 133 to release control of allocated components at one or more terminals. In step 620, a control release message signifies that the Application Processor 133 no longer requires access to the Terminal Interface 114. The Control Complex 103 determines the validity of the request by checking it against allocation made to Application Processor 133 in Component Control Table 500. If the request is invalid, a reject response is sent in step 626 and the process is terminated. If the request is valid, then in step 622, Control Complex 103 identifies the associated Terminal Interface 105 in the Database 106. In step 624 the Terminal Interface 105 is notified to restore the routing for the specified terminal, components (or attributes) in its Routing Table 520. Hence, future uplink messages from Terminal 114, associated with the specified terminal and components, are routed to the Control Complex 103 rather than to Terminal Interface 105, as previously. The Control Complex 103, in step 625, then updates its Component Control Table 520 to indicate the default routing (i.e., to Control Complex 103) and ownership of the specified terminal and components (or attributes).

Under predefined conditions, Control Complex 103 may override and release control, for itself or for other control apparatuses, the control previously allocated to Application Processors. As noted, this may occur during a specific time period, error conditions, higher priority event, condition or application, etc. When a control override occurs, step 650, Control Complex 103 sends update routing messages (309 and 310), in step 624, to update Routing Table 520 at the affected Terminal Interfaces 104 and 105. Control Table 500 to reflect the change in control allocation. Thereafter, Control Complex 103 updates its Component Control Table 500 to reflect the change in control allocation.

With joint reference to FIGS. 1 and 6 we describe the Component Control Table 500 and the Uplink Routing control Table 520 (also referred to as Routing Table 520). The Component Control Table 500 is stored in the Database 106 by the Control Complex 103 and provides centralized information indicating what (i.e., Control Complex 103, Application Processors 133 or 138), controls Terminals 111–114 of the system. This table 500 contains several fields for storing information associated with various terminals. The Terminal field 502 identifies the various terminals (e.g., 114) connected to Control Unit 100. The Component field, 503, identifies various components, at that terminal, that may be utilized by various applications (i.e. application processors). Typically, these components are dependent on the type of terminal and may include, for example, display, buttons, audibles, LEDs, etc. Associated with each component is a set of attributes, field 504, which detail the functions of the selected component. For example, the "display" component may have the following attributes: select all lines on the display, select line X, select lines X through Y, etc. The Routing field 501 specifies for each terminal 502, the combination of components 503 and attributes 504 which are assigned/associated with the control apparatuses (either Application Processor 133, Remote Application Processor 138 or Control Complex 103). Note, different attributes of the same component may be assigned to different control apparatuses. After system initialization, the default routing of all components is to the Control Complex 103. The Routing field 501 is updated as Application Processor requests are received and acknowledged. Thus, a Terminal 114 may have the "audible" component with the "all" attribute assigned to an external Application Processor 133, while the "LED" component (with "all" attribute) could be assigned to the Remote Application Processor 138.

The Routing Table 520 is stored in each Terminal Interface 104 and 105. Each Routing Table 520, as previously described, specifies the routing of terminal messages. The received messages are filtered by the Terminal Interface, using the routing table 520, and identified "components" are passed to the appropriate control apparatus. The Routing Table 520 includes several fields. The Terminal field 526 is the same as that described with respect to field 502 of the Component Control Table 500. The Component field 527 is the same as that described with respect to field 503 of the Component Control Table 500. The Attribute field 528 is the same as field 504 of the Component Control Table 500. The Codeset 6/7 field 530 specifies where Codeset 6/7 received messages should be routed. For example, messages from the Application Processor 133 to the Terminal 114 would have Codeset 7 and be received by the Terminal Interface 105. The Routing Table 520 would indicate that the Codeset 7 message should be routed directly via path 119 to the destination Terminal Interface 104.

With joint reference to FIGS. 1, 3, 4, 5 and 7 we describe the operation of typical Terminal Interfaces 104 and 105. As previously noted, CO Interface 102 operates in a similar manner to Interfaces 104 and 105 to interface CO line 134 to Control Unit 100. A terminal interface is used to process both messages to/from an application processor, e.g., 133, as well as messages to/from a terminal, e.g. 114. An application processor in fact may be considered to be a type of terminal. When the system is powered up, all of the terminal interfaces are in an idle state 701. In step 702, as part of the system initialization, each terminal interface is loaded with Terminal 114 information. The Routing Table 520 is initialized to default routing, i.e., all messages are routed to the Control Complex 103. Upon completion of initialization step 702, the terminal interface, in step 703, is put into a "Wait For Message" state i.e., the terminal interface does nothing but wait for messages to arrive. In step 704, once a message arrives, the terminal interface determines whether the message was sent from the Control Complex 103. If the message was sent from Control Complex 103, then in step 705 it is determined if the Routing Control table 520 should be updated. If the message is of type "Update Uplink Control Table" (309 or 310), the Terminal Interface, in step 707, updates its Routing Table 520 accordingly. In step 705, if the message is not of type "Update Uplink Control Table", the message is outputted by the interface, in step 706, to the Terminal for further processing. Such a message, for example, could have been a Control Complex 103 message to update an LED at Terminal 114. Following steps 706 and 707, the terminal interface returns to the "Wait For Message" state in step 703.

In step 704, if the message was not received from Control Complex 103, the message must have been sent from a Terminal. The step 704 message, for example, could have resulted from a "Control Request" or a "Control Release" request as illustrated by 305 and 313, respectively, in FIG. 3 then control transfers to step 709. At step 709, the terminal interface first identifies the source of the terminal message. Next, in step 710, the terminal interface checks its Routing Table 520 to determine if the identified terminal has been allocated control over the component or attribute. If not, the message is sent in step 716 to Control Complex 103. In step 716, the message is sent to Control Complex 103 for further processing of the message. Such a message, for example, could have been a message reporting a button depression at a Terminal 114 which should be acted upon by Control Complex 103. The terminal interface then returns to the "Wait For Message" state, step 703.

In step 710, if the terminal message is one over which the terminal has been allocated control over, then in step 711, the terminal interface checks for the Codeset this message belongs to. If the received message is Codeset 7 (i.e. NT2/ISDN user Terminal to user terminal message), processing continues at step 712, otherwise, processing continues at step 714.

In step 712, the message needs to be passed directly to the routing destination (i.e. data transfer, for details see FIG. 4). In step 712, the Terminal Interface converts the Codeset 7 message header into a Codeset 6 message header and sends the resulting Codeset 6 message to the routing destination, in step 713. This results if the data transfer phase has been established and Application Processor 133, for example, sends a message via Interface 105, path 119 and Interface 104 to Terminal 114 to update a controlled component directly. Next, the Terminal Interface returns to the "Wait For Message" state, step 703.

In step 714, the Terminal Interface received a Codeset 6 message from a Terminal. The message components and attributes are checked in Routing Table 520 to determine which control apparatus controls them (see 529 of FIG. 5). The routing destination could be the Control Complex 103, in step 716, if, for example, the message was a button message as shown in 529 of FIG. 5. Another routing destination, step 715, is selected if a data transfer phase has been established and Terminal 114 sends a button/keypad message to its controlling Remote Application Processor 138. In either case, the Terminal Interface will return to the "Wait For Message" state, step 703.

While the disclosed embodiment describes using a particular protocol for signaling and data messages (i.e., Codesets 6 and 7), it should be understood that the present invention can be utilized with other types of signaling or messaging formats. Moreover, the Application Processor 133 could, in fact, be an intelligent system terminal which, according to the invention, can be allocated control over components or attributes of other terminals of the system. Additionally, the operating characteristics of the application processor are deemed to apply, equivalently, to some or all of the application programs which may be resident in the application processor.

What has been described is merely illustrative of the application of the principles of the present invention. Other arrangements and methods can be implemented by those skilled in the art without departing from the spirit and scope of the present invention.

We claim:

1. A communication system including a controller for controlling communications between a plurality of system endpoints each connected through an interface and a communication path to said controller, comprising at said controller means for receiving a control request signal from an application processor controlled first endpoint requesting allocation of control over one or more identified components at a communication terminal located at a second endpoint, means responsive to a valid control request signal for transmitting a control acknowledgment signal to said application processor indicating that control over said one or more identified components at said communication terminal has been allocated to said application processor, means responsive to said valid control request signal for updating a component allocation control table to indicate the allocation of control over said one or more identified components of said communication terminal to said application processor, and at a first interface connected to said application processor, means responsive to said acknowledgment signal for enabling said application processor to communicate via the communication path with said communication terminal using an application processor-originated control signal, including a codeset 7 message having an embedded codeset 6 message, which corresponds to a controller-originated control signal used to control said one or more identified components at said communication terminal, means for converting said application processor-originated control signal received from said application processor into a codeset 6 message, and means for sending the codeset 6 message to said communication terminal to control said one or more identified components thereat.

2. The system of claim 1 wherein said control request signal requests control over selected attributes of said one or more identified components at said communication terminal.

3. The system of claim 1 wherein said controller includes means responsive to said valid control request signal for inhibiting said controller from controlling said one or more identified components at said communication terminal except under predefined conditions.

4. The system of claim 1 wherein said controller includes means for receiving a query signal from said application processor requesting information associated with said communication terminal and means responsive to said query signal for accessing a database and providing a query response including said requested information to said application processor.

5. The system of claim 1 wherein said system includes a second interface connected to said communication terminal, means responsive to said valid control request signal for sending an update routing control message to said second interface to enable said communication terminal to communicate with said application processor using a communication terminal-originated signal which corresponds to a controller-originated signal.

6. The system of claim 1 wherein said acknowledgment signal includes an acknowledgment message sent to said application processor and an update routing control message sent to said first interface to enable said first interface to process subsequent messages from the application processor and route them to their destination via an alternate path not involving a call control complex of said controller.

7. The system of claim 1 wherein said acknowledgment signal specifies a subset of a plurality of components at said communication terminal which are allocated for control by said application processor.

8. The system of claim 7 wherein said first interface includes storing means for storing said subset of components and wherein said means for enabling accesses said storing means to determine if a message received from said application processor should be sent to said controller or to said communication terminal.

9. The system of claim 1 wherein said controller includes means responsive to a control release signal from said application processor for sending a signal to said first interface indicating that said one or more identified components at said communication terminal have been deallocated from control of said application processor and wherein said first interface means includes means for inhibiting said application processor from controlling said one or more identified components at said communication terminal.

10. The system of claim 1 wherein said controller includes means responsive to a communication terminal request for sending a service request signal to said application processor and wherein said first interface is responsive to said received service request message for sending said control request signal to said controller.

11. A method of operating a communication system including a controller for controlling communications between a plurality of system endpoints each connected through an interface and a communication path to said controller, said method comprising the steps of receiving a control request signal at said controller from an application processor controlled first endpoint requesting allocation of control over one or more identified components located at a communication terminal of a second endpoint, in response to a valid control request signal, transmitting a control acknowledgment signal to said application processor indicating that control over said one or more identified components located at said communication terminal has been allocated to said application processor, further in response to said valid control request signal, updating a component allocation control table to indicate the allocation of control over said one or more identified components of said communication terminal to said application processor, and at the interface connected to said application processor and in response to said acknowledgment signal, enabling said application processor to communicate via a communication path with said communication terminal using an application processor-originated control signal, including a codeset 7 message having an embedded codeset 6 message, which corresponds to a controller-originated control signal used to control said one or more identified components located at said communication terminal, converting said application processor-originated control signal received from said application processor into a codeset 6 message, and sending the codeset 6 message to said communication terminal to control said one or more identified components thereat.

12. The method of claim 11 wherein said control request signal requests control over selected attributes of said one or more identified components at said communication terminal.

13. The method of claim 11 including the step in response to said valid control request signal, inhibiting said controller from controlling said one or more identified components at said communication terminal except under predefined conditions.

14. The method of claim 11 including the steps of receiving at said controller a query signal from said application processor requesting information associated with said communication terminal and in response to said query signal, accessing a database and providing a query response including said requested information to said application processor.

15. The method of claim 11 wherein at a second interface connected to said communication terminal, and in response to said valid control request signal, sending an update routing control message to said second interface to enable said communication terminal to communicate with said application processor using a communication terminal-originated signal which corresponds to a controller-originated signal.

16. The method of claim 11 wherein said acknowledgment signal includes an acknowledgment message sent to said application processor and an update routing control message sent to said interface.

17. An interface for use in a communication system for controlling communications between a controller and a system communication terminal endpoint thereof and an application processor apparatus connected to said system, said interface comprising first means for transferring to said controller a control request signal received from said application processor apparatus requesting allocation of control over one or more identified components at said system communication terminal, means responsive to said valid control request signal for updating a component allocation control table to indicate the allocation of control over a one or more identified components of said communication terminal to said application processor apparatus, second means, responsive to said valid control request signal, for transferring to said application processor apparatus a control acknowledgment signal received from said controller indicating that control over said one or more identified components located at said system communication terminal has been allocated to said application processor apparatus, and means responsive to said acknowledgment signal for enabling said application processor apparatus to communicate via the communication path with said communication terminal using an application processor-originated control signal, including a codeset 7 message having an embedded codeset 6 message, which corresponds to a controller-originated control signal used to control said one or more identified components at said communication terminal, means for convening said application processor-originated control signal received from said application processor apparatus into a codeset 6 message, and means for sending the codeset 6 message to said communication terminal to control said one or more identified components thereat.

18. The interface of claim 17 including storing means for storing information identifying said one or more identified components and means for accessing said storing means and for determining if a message received from said application processor apparatus should be sent to said controller or to said system communication terminal.

19. The interface of claim 17 wherein said second means for transferring is responsive to a control release signal received from said controller for sending a signal to said application processor apparatus indicating that said one or more identified components located at said system communication terminal have been deallocated from control by said application processor apparatus and wherein said interface further includes means for inhibiting said application processor apparatus from subsequently controlling said one or more identified components at said system communication terminal.

20. A method of operating an interface for use in a communication system for controlling communications between a controller and a communication terminal endpoint thereof and an application processor apparatus connected to said system, said method comprising the steps of transferring to said controller a control request signal from said application processor apparatus requesting allocation of control over one or more identified components at said communication terminal, transferring to said application processor apparatus, in response to a valid control request signal, a control acknowledgment signal received from said controller endpoint indicating that control over said one or more identified components located at said communication terminal has been allocated to said application processor apparatus, and further in response to said valid control request signal, updating a component allocation control table to indicate the allocation of control over said one or more identified components of said communication terminal to said application processor apparatus, and at the interface connected to said application processor apparatus and in response to said acknowledgment signal, enabling said application processor apparatus to communicate via a communication path with said communication terminal using an application processor-originated control signal, including a codeset 7 message having an embedded codeset 6 message, which corresponds to a controller-originated control signal used to control said one or more identified components located at said communication terminal, converting said application processor-originated control signal received from said application processor apparatus into a codeset 6 message, and sending the codeset 6 message to said communication terminal to control said one or more identified components thereat.

21. A control unit for use in a communication system, said control unit including a controller for controlling communications between a plurality of system endpoints each connected to an interface of said control unit, comprising at said controller means for receiving a control request signal from an application processor controlled first endpoint requesting allocation of control over one or more identified components located at a communication terminal controlled second endpoint, means responsive to a valid control request signal for transmitting a control acknowledgment signal to said application processor indicating that control over said one or more identified components located at said communication terminal has been allocated to said application processor, means responsive to said valid control request signal for updating a component allocation control table to indicate the allocation of control over said one or more identified components of said communication terminal to said application processor, and at the interface connected to said application processor, means responsive to said acknowledgment signal for enabling said application processor to communicate via the communication path with said communication terminal using an application processor-originated control signal, including a codeset 7 message having an embedded codeset 6 message, which corresponds to a controller-originated control signal used to control said one or more identified components at said communication terminal, means for converting said application processor-originated control signal received from said application processor into a codeset 6 message, and means for sending the codeset 6 message to said communication terminal to control said one or more identified components thereat.

22. A method of operating a control unit for use in a communication system, said control unit including a controller for controlling communications between a plurality of system endpoints each connected to an interface of said control unit, said method comprising the steps of at said controller receiving a control request signal from an application processor controlled first endpoint requesting allocation of control over one or more identified components at a communication terminal controlled second endpoint, in response to a valid control request signal, transmitting a control acknowledgment signal to said application processor indicating that control over said one or more identified components located at said communication terminal has been allocated to said application processor, further in response to said valid control request signal, updating a component allocation control table to indicate the allocation of control over said one or more identified components of said communication terminal to said application processor, and at the interface connected to said application processor and in response to said acknowledgment signal, enabling said application processor to communicate via a communication path with said communication terminal using an application processor-originated signal, including a codeset 7 message having an embedded codeset 6 message, which corresponds to a controller-originated control signal used to control said one or more identified components located at said communication terminal, converting said application processor-originated control signal received from said application processor into a codeset 6 message, and sending the codeset 6 message to said communication terminal to control said one or more identified components thereat.

* * * * *